United States Patent Office 2,710,864
Patented June 14, 1955

2,710,864

METHOXYPHENYLHEPTYLAMINE SALT OF PENICILLIN

John V. Scudi, Springfield, N. J., and Leon E. Tenenbaum, Brooklyn, N. Y., assignors to Nepera Chemical Co., Inc., Yonkers, N. Y., a corporation of New York No Drawing. Application October 27, 1953, Serial No. 388,701

2 Claims. (Cl. 260—239.1)

This invention relates to penicillin salts and relates more particularly to highly insoluble salts of penicillin useful therapeutically for parenteral and topical administration.

An object of this invention is the production of stable penicillin salts which are characterized by a high order of aqueous insolubility.

Other objects of this invention will appear from the following detailed description.

This application is a continuation-in-part of our co-pending application Serial No. 318,739 filed November 4, 1952, now abandoned.

We have found that by reacting penicillin with the amine 3-(p-methoxyphenyl)-N,N-dimethyl-heptylamine having the formula

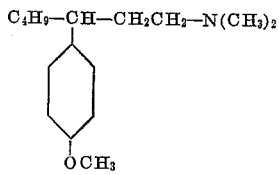

a crystalline salt of said amine and penicillin is obtained which has an unusual degree of aqueous insolubility and an exceedingly low hydroscopicity.

In order further to illustrate our invention but without being limited thereto, the following example is given:

*Example*

To 6.75 grams of sodium penicillin G are added 150 cc. of cold 0.2 M phosphate buffer (pH=2.5). The solution obtained is extracted three times with cold ethyl acetate employing 50 cc. of ethyl acetate for each extraction. The extracts are combined, dried over anhydrous sodium sulfate and the dried ethyl acetate separated from the sodium sulfate by filtration. 4.9 grams of 3-(p-methoxyphenyl)-N,N-dimethyl-heptylamine are then added and the solution is concentrated by maintaining it at room temperature while under a pressure of about 15 mm. When the volume is reduced to about 50 cc., crystals of prismatic shape begin to separate. After standing for about 10 hours at a temperature of 5° C. the crystalline product is separated from the supernatant liquid by filtration. The crystalline product, comprising the penicillin G salt of 3-(p-methoxyphenyl)-N,N-dimethyl-heptylamine, has a melting point of 132–4° C. Nitrogen analysis gives a nitrogen content of 7.15%, the theoretical nitrogen content being 7.20%.

The novel salt of our invention has a low hydroscopicity, having a moisture content of 0.51% which, after drying under vacuum at 60° C. for three hours, is reduced to 0.15%. Assay by the iodometric method indicates an average potency of 998 $\mu$/mg. while the biological assay indicates a potency of 1010 $\mu$/mg. The solubility of our novel salt was determined by adding a weighed amount to sufficient water to form a saturated solution, filtering off the solution formed and then subjecting it to assay. The solubility was found to be as follows with the amounts added to form the solution being indicated:

| | Amount Added, mg./ml. | Potency of Saturated Solution, $\mu$./ml. |
|---|---|---|
| a | 5.05 | 3,035 |
| b | 10.19 | 4,260 |
| c | 21.46 | 5,300 |
| d | 40.13 | 5,720 |

A saturated solution obtained by adding 20 mg./ml. of water is found to have a pH of 8.5.

Determination of the infra-red spectrum shows absorption at 8.0, 9.12, 9.66, 9.98, 10.42, 11.28, 11.98 and 13.05 microns.

A solution of 0.2 mg./ml. of our novel salt in ethanol shows the following ultraviolet light absorption: minima at 250, 281 and 200 m$\mu$; maxima at 277, 284 and 325 m$\mu$. The extinction found is:

$$E_{1\,cm.}^{1\%} \ 277 \ m\mu = 30.3 \qquad E_{1\,cm.}^{1\%} \ 284 \ m\mu = 26.5$$

The penicillin G salt of 3-(p-methoxyphenyl)-N,N-dimethyl-heptylamine has been found to persist at higher activity levels in the animal body for longer periods, after parenteral administration in amounts of 5000 units of penicillin per kg. of body weight, than the procaine salt of penicillin, also parenterally administered at the same dosage level.

The 3-(p-methoxyphenyl)-N,N-dimethyl-heptylamine salts of other penicillins such as F, dihydro F, X and K and mixtures of said penicillins are also included within the scope of our invention.

It is understood that the foregoing detailed description is given merely by way of illustration and that many variations may be made therein without departing from the spirit of our invention.

Having described our invention, what we desire to secure by Letters Patent is:

What we claim is:

1. A salt of penicillin and 3-(p-methoxyphenyl)-N,N-dimethylheptylamine.

2. A salt of penicillin G and 3-(p-methoxyphenyl)-N,N-dimethylheptylamine.

References Cited in the file of this patent

UNITED STATES PATENTS

| 2,493,625 | Goldberg et al. | Jan. 3, 1950 |
| 2,550,398 | Barol | Apr. 24, 1951 |
| 2,557,762 | Rawlins et al. | June 19, 1951 |
| 2,569,666 | Granatek | Oct. 2, 1951 |
| 2,676,173 | Hiltmann et al. | Apr. 20, 1954 |